(12) United States Patent
Chappell et al.

(10) Patent No.: US 12,393,176 B1
(45) Date of Patent: Aug. 19, 2025

(54) APPARATUS AND METHOD FOR INITIATING A COMMAND FOR AN EQUIPMENT CONTROLLER

(71) Applicant: Quick Quack Car Wash Holdings, LLC, Roseville, CA (US)

(72) Inventors: Christopher Clinton Chappell, Lincoln, CA (US); Rodney Daniel Sparks, Antelope, CA (US); Josh David Schumacher, Sacramento, CA (US); Joseph Allen Steele, III, Plumas Lake, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/638,258

(22) Filed: Apr. 17, 2024

(51) Int. Cl.
*G05B 19/4155* (2006.01)

(52) U.S. Cl.
CPC .................. *G05B 19/4155* (2013.01); *G05B 2219/31229* (2013.01)

(58) Field of Classification Search
CPC .......................................... G05B 2219/31229
See application file for complete search history.

(56) References Cited

U.S. PATENT DOCUMENTS

| | | | |
|---|---|---|---|
| 11,127,283 B2 * | 9/2021 | Ness | G06T 7/292 |
| 11,623,617 B2 | 4/2023 | Heinz | |
| 2004/0079799 A1 * | 4/2004 | Symonds | G06Q 30/06 235/381 |
| 2018/0281752 A1 * | 10/2018 | Detrick | B08B 1/32 |
| 2019/0056977 A1 * | 2/2019 | Wang | G06F 13/4027 |
| 2021/0165377 A1 * | 6/2021 | Yoon | D06F 34/28 |
| 2022/0214673 A1 * | 7/2022 | Wu | G05B 23/0227 |
| 2023/0372030 A1 * | 11/2023 | Shelton, IV | G16H 20/40 |

FOREIGN PATENT DOCUMENTS

| | | |
|---|---|---|
| CN | 111196251 A | 5/2020 |
| GB | 8815347 | 8/1988 |
| JP | 2002293223 A | 10/2002 |
| JP | 4893597 B2 | 3/2012 |

* cited by examiner

*Primary Examiner* — Nathan L Laughlin
(74) *Attorney, Agent, or Firm* — Caldwell Intellectual Property Law

(57) ABSTRACT

Disclosed herein is an apparatus and method for initiating a command for an equipment controller. An apparatus may include a computing device configured to receive a structured data package from a primary controller; identify an equipment command as a function of the structured data package; initiate the equipment command by transmitting the equipment command to an equipment controller; and, after initiating the equipment command, transmit an unstructured signal comprising a sensor output to the primary controller. An equipment command may configure the equipment controller to utilize a function of equipment associated with the equipment controller.

20 Claims, 8 Drawing Sheets

APPARATUS AND METHOD FOR INITIATING A COMMAND FOR AN EQUIPMENT CONTROLLER

FIELD OF THE INVENTION

The present invention generally relates to the field of automated control systems. In particular, the present invention is directed to initiating a command for an equipment controller.

BACKGROUND

Traditionally, many applications have collected data locally, and transmitted it to a central data center for processing. However, modern systems may involve large amounts of data processing, potentially burdening devices responsible for data communication over long distances.

SUMMARY OF THE DISCLOSURE

In an aspect, an apparatus for a command for an equipment controller may include at least a processor; and a memory communicatively connected to the at least processor, wherein the memory contains instructions configuring the at least processor to receive a structured data package from a primary controller; identify an equipment command as a function of the structured data package; initiate the equipment command by transmitting the equipment command to an equipment controller; and, after initiating the equipment command, transmit an unstructured signal comprising a sensor output to the primary controller; wherein the equipment command configures the equipment controller to utilize a function of equipment associated with the equipment controller.

In another aspect, a method of a command for an equipment controller may include using at least a processor, receiving a structured data package from a primary controller; using at least a processor, identifying an equipment command as a function of the structured data package; using at least a processor, initiating the equipment command by transmitting the equipment command to an equipment controller; and, using at least a processor, after initiating the equipment command, transmitting an unstructured signal comprising a sensor output to the primary controller; wherein the equipment command configures the equipment controller to utilize a function of equipment associated with the equipment controller.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for initiating a command for an equipment controller. In some embodiments, a computing device may receive sensor output and may transmit it to a primary controller. A computing device may receive a structured data package from a primary controller. A computing device may determine an equipment command 140 based on the structured data package and may implement the equipment command by transmitting it to an equipment controller.

Figure 1:
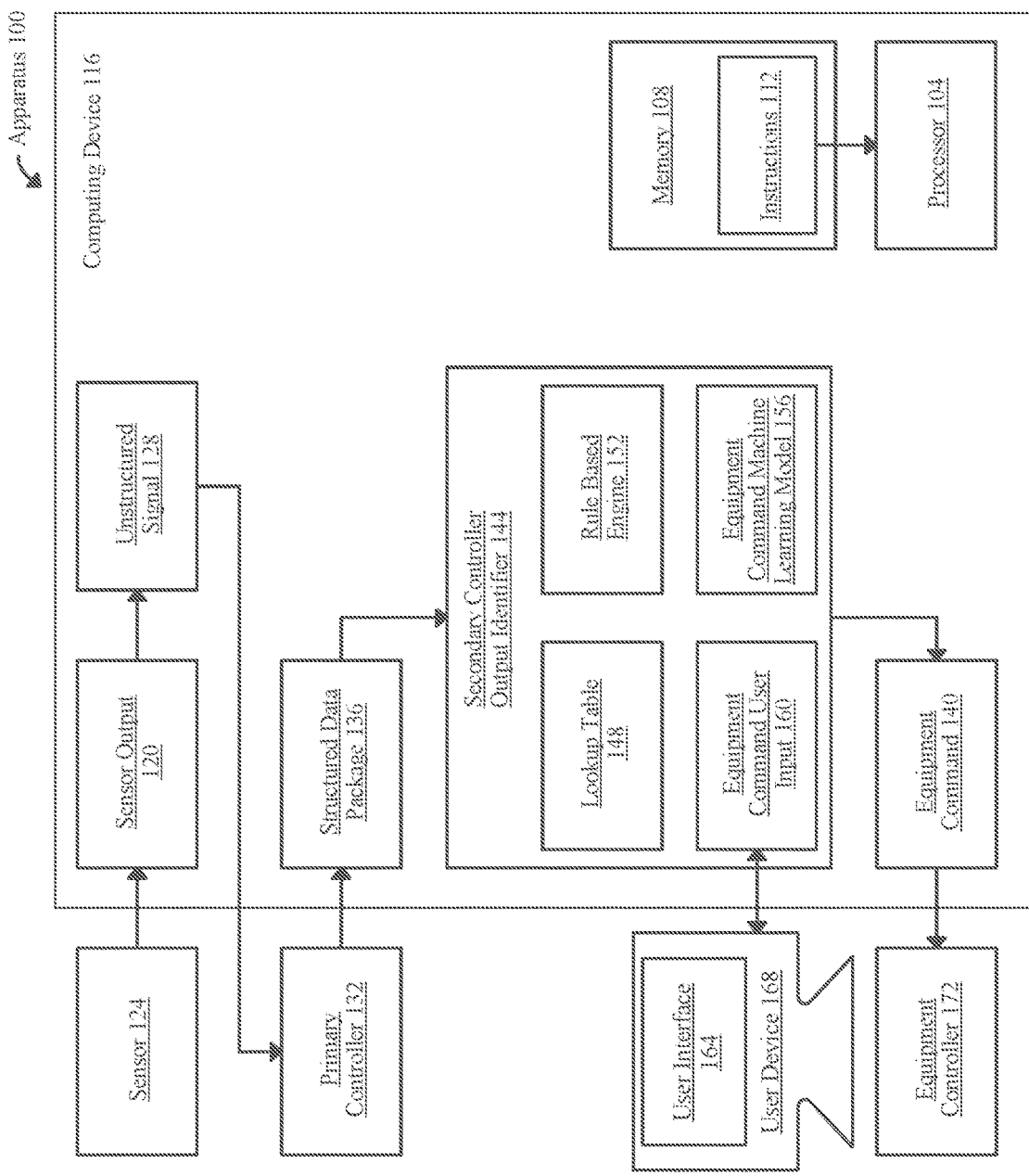
FIG. 1 is a diagram depicting an exemplary apparatus for a command for an equipment controller.

Referring now to FIG. 1, an exemplary embodiment of an apparatus 100 for initiating a command for an equipment controller is illustrated. Apparatus 100 may include a computing device. Apparatus 100 may include a processor. Processor 104 may include, without limitation, any processor described in this disclosure. Processor 104 may be included in computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing device 116 may include processor 104 and/or memory 108. Computing device 116 may be configured to perform one or more processes described herein.

Still referring to FIG. 1, computing device 116 may include but is not limited to, for example, a computing device or cluster of computing devices in a first location and a second computing device or cluster of computing devices in a second location. Computing device 116 may include one or more computing devices dedicated to data storage, security, distribution of traffic for load balancing, and the like. Computing device 116 may distribute one or more computing tasks as described below across a plurality of computing devices of computing device, which may operate in parallel, in series, redundantly, or in any other manner used for distribution of tasks or memory between computing devices. Computing device 116 may be implemented, as a non-limiting example, using a "shared nothing" architecture.

Still referring to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may include a localized controller or processor embedded within each individual service unit of the larger networked system. In some embodiments, apparatus 100 may include a control circuit. As used herein, a "control circuit" is an integrated circuit, a collection of interconnected circuits, or both designed to manage, control, interface with, or perform a combination of these functions with respect to one or more functionalities of one or more pieces of equipment. In a non-limiting example, apparatus 100 may include a computing device as described in this disclosure, including without limitation a processor, a microcontroller, a microprocessor, a digital signal processor (DSP) and/or a system on a chip (SoC) that provide one or more services, resources, or data to other computing devices. In another non-limiting example, apparatus 100 may include a local server. Apparatus 100 may additionally, or alternatively, include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. In some cases, apparatus 100 may include but is not limited to, for example, a computing device or cluster of computing devices in a first location and a second computing device or cluster of computing devices in a second location. In other cases, apparatus 100 may include a main unit or a primary circuit in a network that controls communications and/or provide a central point of interface.

Still referring to FIG. 1, in some embodiments, apparatus 100 may include a multi-core processor. As used herein, a "multi-core processor" is an integrated circuit that contains at least two cores on a single chip. In some cases, at least two processor cores may work simultaneously, allowing multiple tasks to be executed in parallel. As used herein, a "core" is an individual processor unit within a larger processing unit. Such a larger processing unit may include, in non-limiting examples, a central processing unit (CPU) or graphics processing unit (GPU). In some cases, "core" may be used interchangeably with the terminology "processor" in this disclosure. Each core of at least two cores may be capable of reading and/or executing one or more program instructions, performing arithmetic operations, managing data, and/or communicating with other secondary control units. In a non-limiting example, apparatus 100 may include a dual-core processor, quad-core processor, hexa-core processor, octa-core processor, many-core processor, or any processor that may perform simultaneous multi-threading (SMT) and/or dynamic core allocation. In some cases, apparatus 100 may include one or more integrated graphics cores. In some cases, apparatus 100 may include a cache architecture, wherein each core may include a private L1 (and in some cases, L2) cache, and all cores may share a larger L3 cache. In some cases, apparatus 100 may integrate at least two cores that are not identical, for example, and without limitation, a high-performance "heavy" core may be combined with an energy-efficient "lite" core. Apparatus 100 may choose the best core for a task based on power and/or performance needs.

Still referring to FIG. 1, in some cases, apparatus 100 may implement a network-on-chip design. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Still referring to FIG. 1, a memory may be communicatively connected to apparatus 100. As used herein, a "memory" is a device used to store programs or data on a temporary or permanent basis for use in apparatus 100 or other computing devices as described herein. In some cases, memory may include a space for data to be read or written. In a non-limiting example, memory may include a random access memory (RAM). In some cases, RAM may include a dynamic RAM (DRAM) that stores each bit of data in a separate capacitor within apparatus 100 and being constantly refreshed to maintain the data. In other cases, RAM may include a static RAM (SRAM) that uses one or more flip-flops to store data (i.e., no need for refreshing). In one or more embodiments, memory may be read only (i.e., ROM). Data that is stored in ROM may be hard-wired and cannot be easily altered or re-written. In some cases, memory may retain data even after the power of apparatus 100 is turned off; however, in some cases, data within memory may be wiped and/or removed after apparatus 100 has been turned off and/or use of a particular software has been terminated. In some cases, memory may be programmable. In some cases, user may erase memory (with UV light) and reprogram memory. In some cases, memory may include a flash memory e.g., USB drive, memory card, solid-state drive (SSD), or the like. In some cases, memory may include cache memory, wherein apparatus 100 may store data used most often in the cache memory, thereby making it instantly available to speed up the apparatus 100. Other exemplary embodiments of memory may include, without limitation, magnetic memory (e.g., hard disk drive [HDD]), optical memory, magnetic tape memory, phase-change memory (PCM), ferroelectric RAM (FeRAM or FRAM), and the like. In some cases, apparatus 100 may include one or more computing devices dedicated to data storage, security, distribution of traffic for load balancing, and the like. In a non-limiting example, memory may include a secondary memory such as an HDD configured to be a long-term storage device in which an operating system and other information is stored. In some cases, data may be retrieved from secondary memory and transmitted to primary memory e.g., RAM during operation of apparatus 100.

Still referring to FIG. 1, in some embodiments, apparatus 100 may receive a sensor output 120 from a sensor 124. As used herein, a "sensor" is a device that detects a phenomenon. Sensor 124 may include, in non-limiting examples, a temperature sensor, a water pressure sensor, a camera, a microphone, and the like. For example, and without limitation, a sensor may transduce a detected charging phenomenon and/or characteristic, such as, and without limitation, temperature, pressure, flow rate, moisture level, acoustic vibrations, optical signals, electrical current, chemical composition, and the like, into a sensed signal such as a voltage with respect to a reference. In some embodiments, apparatus 100 may receive a first user input. For example, a first user may interact with a kiosk, and apparatus 100 may receive data associated with such interaction.

Still referring to FIG. 1, in some embodiments, apparatus 100 may transmit an unstructured signal 128 to primary controller 132. An unstructured signal may include a communication including a datum not in the form of a predetermined data structure. In a non-limiting example, a structured communication may include data organized in a table, while an unstructured signal may include data not organized in such a manner. Unstructured signal 128 may include in non-limiting examples, images, audio clips, video feeds, multimedia data, textural data, numerical measurements, and the like. In some cases, unstructured signal 128 may not conform to a standard structure (e.g., schema or database table). In a non-limiting example, unstructured signal 128 may include a continuous or discontinuous readings which may be characterized by one or more irregular intervals or formats. In some cases, unstructured signal 128 may include a stream of data, such as, without limitation, real-time temperature measurements, pressure levels, energy usage, flow rates, where data may be captured and transmitted at regular, uninterrupted intervals. In other cases, unstructured signal 128 may include data captured at irregular or sporadic intervals such as, without limitation, operational parameters or sensor data that is only recorded when certain conditions are met e.g., specific threshold being crossed, or an event being detected. Examples of discontinuous readings may include alarm triggers, irregular equipment usage logs, environmental changes, among others that only occasionally impact the plurality of service units' operations. In another non-limiting example, unstructured data may include image or video data from a camera as it is captured, or temperature or water pressure data as it is gathered. In some embodiments, apparatus 100 may send unstructured data to primary controller 132 as it is collected. In some embodiments, apparatus 100 may send unstructured data to primary controller 132 periodically. In a non-limiting example, temperature sensor data may be sent once per minute.

Still referring to FIG. 1, in some cases, analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. In some cases, continuous-time signal processing may be used, in some cases, to process signals which varying continuously within a domain, for instance, time. Exemplary non-limiting continuous time processes may include time domain processing, frequency domain processing (Fourier transform), and complex frequency domain processing. In some cases, discrete time signal processing may be used when a signal is sampled non-continuously or at discrete time intervals (i.e., quantized in time). In an embodiment, analog discrete-time signal processing may process a signal using the following exemplary circuits sample and hold circuits, analog time-division multiplexers, analog delay lines and analog feedback shift registers. In some cases, digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). In an embodiment, digital signal processing may be used to perform any combination of typical arithmetical operations, including fixed-point and floating-point, real-valued and complex-valued, multiplication and addition. In another embodiment, digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. In some cases, statistical signal processing may be used to process a signal as a random function (i.e., a stochastic process), utilizing statistical properties. For instance, and without limitation, in some embodiments, a signal may be modeled with a probability distribution indicating noise, which then may be used to reduce noise in a processed signal.

Still referring to FIG. 1, in some embodiments, apparatus 100 may filter data before sending it to primary controller 132. In a non-limiting example, apparatus 100 may only send data when the data has certain values, and/or may send average sensor readings periodically rather than each sensor reading collected. In another non-limiting example, image and/or video data may only be sent when a change in the image is detected. In some embodiments, data filtering may be done to remove noise or irrelevant data from sensor readings. In a non-limiting example, apparatus 100 may be configured to refine operational parameter data using one or more data filtering algorithms e.g., moving average filters, Kalman filters, low-pass filters, and/or the like. In some cases, preliminary data processing may include one or more data normalization operations (i.e., converting data into a common scale) and data formatting operations (e.g., converting analog signals to digital formats or encoding data) to facilitate a uniform analysis and integration of data (as described in further detail below) from diverse sources. In a non-limiting example, operational parameters such as temperature (for water, air dryers, climate control in service area), pressure levels, flow rates (of water and cleaning solutions), chemical concentration (in detergents and waxes), moisture content (in drying areas), speed (of conveyor belts, brushes, blowers), rotation speed (for rotating brushes and scrubbers), electrical consumption (across all electrical devices, including lighting and automated machinery), water usage, vibration levels (in machinery), acoustic signals (from equipment), vehicle data, vehicle contamination level, transaction data (from point-of-sale [POS] systems), customer feedback (such as inputs from interactive kiosks or digital feedback systems), inventory levels (in vending machines and for consumables like detergents and waxes), air quality, lightings, device hardware and software information (including network connectivity), device usage patterns (of plurality of equipment), current device configurations, service time and operational downtime, among others may be standardized and formatted by apparatus 100 for consistent processing across the network. In other cases, preliminary data processing may include data compression to reduce the size of received plurality of operational parameters for more efficient storage and transmission as described below. In a non-limiting example, apparatus 100 may be configured to implement downsampling techniques, which involves reducing the sampling rate of plurality of operational parameters, or using data compression algorithms e.g., ZIP or Run-Length Encoding (RLE) to minimize data volume without significant loss of information. Other exemplary embodiments of preliminary data processing operations may include, without limitation, time-stamping for chronological ordering, error detection and correction, and basic feature extraction to identify key data attributes.

Still referring to FIG. 1, in some embodiments, an unstructured signal may include an operational parameter. As used herein, an "operational parameter" is a measurable variable that influences the performance of equipment. In some cases, an operational parameter may include one or more physical measurements; for example, and without limitation, temperature, pressure, flow rates (e.g., water or air flow in a car wash system), speed, rotation (such as brush or wheel speeds), moisture levels, and/or the like. In some cases, operational parameter detected by sensor 124 may include one or more values related to resource consumption. In an embodiment, parameters such as electricity consumption, water usage, or the use of any other consumables may be monitored. In some cases, operational parameter may also include one or more quality indicators e.g., parameters that indicate the quality of vehicle service being performed, by one or more service units such as, without limitation, the consistency of a coating in a painting process or the cleanliness level in a washing process. In some cases, operational parameter may include one or more sensed data elements with respect to one or more environmental conditions. Such operational parameters may include, without limitation, ambient temperature, humidity, or other environmental factors that could potentially affect one or more operations of equipment. In some cases, operational parameter may additionally, or alternatively, include equipment health data. In a non-limiting example, parameters that indicate the condition of the equipment, such as battery status, vibration levels, wear and tear indicators, signs of potential malfunction, and/or the like. Such operational parameter may further include one or more safety metrics and/or efficiency metrics, for example, and without limitation, parameters ensure operation is within safe limits (e.g., avoiding overheating, excessive pressure, or other hazardous conditions) and parameters that measure the efficiency of operations e.g., time taken for a process, energy efficiency, material utilization efficiency, among others.

Still referring to FIG. 1, in some embodiments, a plurality of sensors including sensor 124 may include, in non-limiting examples temperature sensors (e.g., thermocouples, resistance temperature detectors [RTDs], infrared sensors, and/or the like), pressure sensors (e.g., piezoelectric sensors, strain gauge pressure sensors, capacitive pressure sensors, pressure transducers and/or the like), flow sensors (e.g., turbine flow meters, ultrasonic flow meters, electromagnetic flow meters, and/or the like), moisture or humidity sensors (e.g., capacitive moisture sensors, resistive moisture sensors, and/or the like), acoustic sensors (e.g., microphones, ultrasonic sensors, and/or the like), electrical sensors (e.g., ammeters, voltmeters, and/or the like), speed sensors (e.g., tachometers, hall effect sensors, and/or the like), rotation sensors (e.g., gyroscopes, rotary encoders, and/or the like), vibration sensors (e.g., accelerometers, seismometers, and/or the like), chemical sensors (e.g., gas sensors, pH sensors, and/or the like), proximity sensors (e.g., ultrasonic, capacitive, inductive sensors for detecting the presence or absence of objects), load cells, position sensors (e.g., linear variable differential transformers [LVDT], potentiometers, and/or the like), and the like. In some cases, a sensor may be directly integrated into equipment. For example, sensors such as temperature, pressure, and flow sensors may be directly integrated into one or more mechanical parts of service units e.g., (washing jects, drying units, and/or the like). In some cases, sensor 124 e.g., acoustic, vibration, moisture sensors may be surface mounted to each equipment item of a plurality of equipment items where direct integration is not feasible. Sensors for monitoring external operational parameters (e.g., environmental conditions) may be surface mounted to each equipment item. In some cases, plurality of (wireless) sensors may be Bluetooth-enabled. In some cases, plurality of sensors may be portable or removable (for periodic monitoring or in situations where permanent installation is not required or desired). In some cases, sensor 124 e.g., environmental sensors that measuring ambient conditions may be placed around equipment. In some cases, sensor 124 may be installed in-line with wires, pipes, or hoses. In some cases, one or more sensor arrays (i.e., array of different types of sensors working in tandem or individually) may be used to provide comprehensive monitoring simultaneously, for example, a combination of optical, acoustic, and pressure sensors used for monitoring a car wash system as described herein. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

Still referring to FIG. 1, in some embodiments, an unstructured signal may include data indicating that equipment malfunction has occurred and/or is at an increased likelihood of occurring. For example, a spike in temperature outside of a normal range may indicate that equipment malfunction has occurred and/or is at increased likelihood of occurring. In some embodiments, an unstructured signal may include data associated with normal operations of a facility. For example, an unstructured signal may indicate that a first user has interacted with a kiosk and selected a car wash using a user interface of the kiosk.

Still referring to FIG. 1, in some embodiments, apparatus 100 may be associated with one or more items of equipment and/or one or more facilities including equipment. For example, apparatus 100 may include a secondary controller of a plurality of secondary controllers, each secondary controller being associated with one or more facilities. In some embodiments, unstructured signal 128 may indicate a status of a system associated with equipment associated with apparatus 100. A variety of forms of equipment may be compatible with apparatus and methods described herein. In non-limiting examples, apparatus 100 may be associated with equipment used for manufacturing, transportation, communications, and resource extraction. In some embodiments, apparatus 100 may be associated with car wash tunnel equipment and/or a facility including a car wash tunnel.

Still referring to FIG. 1, in some embodiments, apparatus 100 may be associated with vehicle care equipment and/or a facility including vehicle care equipment. As used herein, "vehicle care equipment" is equipment at a location where vehicles are serviced, repaired, maintained, washed, dried, modified, or a combination thereof. Vehicles may include, without limitation, cars, trucks, buses, motorcycles, boats, airplane, and the like. As used herein, a "vehicle care site" is a location including vehicle care equipment. In a non-limiting example, a vehicle service site may include a car wash site. In another non-limiting example, a vehicle service site may include a car wash tunnel. In other cases, plurality of equipment may include systems and devices across various other industries and application beyond vehicle service sites, for example, and without limitation, in manufacturing, apparatus 100 as described herein may be used to manage and control a network of automated manufacturing devices and robots deployed in multiple production lines. Additionally, or alternatively, in another non-limiting example, apparatus 100 as descried herein may be applied to management of smart buildings, such as controlling various sub-systems e.g., HVAC (Heating, Ventilation, Air Conditioning), lighting, security, energy management and/or the like.

Still referring to FIG. 1, in some cases, exemplary vehicle care equipments may include, without limitation, equipment for washing vehicles, vacuuming vehicles, oil changes, tire rotation, brake inspection, air filter replacement, battery service, cooling system flush, transmission service, timing belt replacement, spark plug replacement, and the like. For example, vehicle care equipment may include one or more vehicle drying units and/or one or more vacuum machines. A vacuum machine may include, for example, a self service vacuum machine and/or a commercial grad vacuum cleaner designed for automotive use. Additional equipment at a vehicle care site may include, in non-limiting examples, vehicle care equipment, equipment for purchasing snacks, equipment for payment processing, restroom equipment, and the like. For example, a vending machine may be configured to dispense vehicle care products such as air fresheners, cleaning supplies, detailing tools, and the like. Other exemplary embodiments of vehicle care equipment may include, without limitation, waxing unit, tire inflation device, fluid dispensing machine, diagnostic and maintenance tools (e.g., code readers, battery testers, tire pressure monitoring systems, etc.,) and the like.

Still referring to FIG. 1, equipment, such as vehicle care equipment may be consistent with any equipment and/or feature disclosed in U.S. patent application Ser. No. 18/637,290, filed on Apr. 16, 2024, and titled "APPARATUS AND METHOD FOR A MULTI-STAGE CAR WASH," and/or U.S. patent application Ser. No. 18/637,237, filed on Apr. 16, 2024, and titled "SYSTEMS AND METHODS FOR DRYING A VEHICLE," the entirety of each of which is hereby incorporated by reference.

Still referring to FIG. 1, in some embodiments, primary controller 132 may determine structured data package 136 as a function of unstructured signal 128. For example, primary controller 132 may organize data from unstructured signal 128 into a data structure. Generation of structured data package 136 by primary controller 132 may be performed using a data aggregator. In another example, unstructured signal 128 may include video data of a car wash interior, primary controller 132 may apply machine vision techniques to determine that a vehicle is off of a track and may generate structured data package 136 including an instruction to stop car wash equipment in that car wash and may transmit that structured data package 136 to apparatus 100.

Still referring to FIG. 1, in some embodiments, primary controller 132 may transmit structured data package 136 to apparatus 100 based on a request, such as an application programming interface (API) request from apparatus 100. In some embodiments, primary controller 132 may transmit structured data package 136 to apparatus 100 without first receiving a request.

Still referring to FIG. 1, one or more features of an apparatus, data package, signal, or method described herein may be consistent with any feature disclosed in U.S. patent application Ser. No. 18/196,205, filed on May 11, 2023, and titled "SYSTEM AND METHOD FOR PROVIDING A SEAMLESS VEHICLE CARE AT A VEHICLE CARE SITE," and/or U.S. patent application Ser. No. 18/638,095, filed on Apr. 17, 2024, and titled "SYSTEM AND METHODS FOR MANAGING AND CONTROLLING A NETWORK OF DISTRIBUTED SERVICE UNITS," the entirety of each of which is hereby incorporated by reference.

Still referring to FIG. 1, in some embodiments, apparatus 100 may receive structured data package 136 from primary controller 132. As used herein, a "structured data package" is a communication including data in the form of a data structure. In some embodiments, a data structure may include one or more functions and/or variables, as a class might in object-oriented programming. In some embodiments, a data structure may include data in the form of a Boolean, integer, float, string, date, and the like. In a non-limiting example, a structured data package 136 may include an int value representing a desired temperature in Celsius. In some embodiments, data in a data structure may be organized in a linked list, tree, array, matrix, tenser, and the like. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date. As used herein, a "primary controller" is a computing device configured to transmit structured data packages to a plurality of computing devices associated with equipment, facilities containing equipment, or both.

Still referring to FIG. 1, in some embodiments, structured data package 136 may be designed for an API-level interaction between apparatus 100 and primary controller 132. As used in this disclosure, an "API-level interaction" is a mode of communication and data exchange that is facilitated through one or more Application Programming Interfaces (APIs), wherein APIs provide a set of rules and protocols for building and interacting with one or more software applications within the system. In a non-limiting example, structured data package 136 may enable API-level interaction between primary controller 132 and apparatus 100 by providing a standardized and well-defined format e.g., JSON, XML, or even a custom data format for data exchange. This ensures that both primary controller 132 and apparatus 100 may parse and understand structured data without ambiguity. In a non-limiting example, apparatus 100 may efficiently retrieve and process embedded data correctly by a data schema with defined data fields, types of data, hierarchical arrangement of the data, and/or the like.

Still referring to FIG. 1, in some embodiments, communication between primary controller 132 and apparatus 100 may be implemented using a cryptographic system. A cryptographic system may include system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." An encryption process may involve the use of a datum, known as an "encryption key," to alter plaintext. A cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, a cryptographic system may be asymmetric. In some embodiments, encryption and/or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Still referring to FIG. 1, in some embodiments, one or more data entries, data blocks, or data clusters of structured data package 136 may be hashed, creating a digital fingerprint of unstructured signal 128. Primary controller 132 may produce cryptographic hashes, also referred to by the equivalent shorthand term "hashes." As used herein, a "cryptographic hash" is a mathematical representation of a set of data. For example, such mathematical representation may include files or blocks in a block chain as described in further detail below. In some embodiments, a mathematical representation may be produced by a lossy one-way algorithm known as a hashing algorithm. Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an avalanche effect, whereby even extremely small changes to lot of data produce drastically different hashes. This may thwart attempts to avoid the computational work necessary to recreate a hash by simply inserting a fraudulent datum in data lot, enabling the use of hashing algorithms for tamper-proofing data such as data contained in an immutable ledger as described in further detail below. This avalanche or cascade effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOIT") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original data to be hashed will change the resulting hash so extensively that the original hash and the new hash appear uncorrelated to each other. A degree of security of a hash function in practice may depend both on the hash function itself and on characteristics of the data and/or digest used in the hash function. For example, where a data entry within structured data package 136 is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of structured data package 136 may be augmented by increasing the length or potential length of each data entry, data block/cluster, or by implementing a protocol whereby one or more randomly selected strings or sets of additional unstructured inputs are added to the structured data package 136, rendering a dictionary attack significantly less effective.

Still referring to FIG. 1, structured data package 136 may include a secure timestamp generated based on the current time of a master clock that is recorded in a hash chain. In an embodiment, a hash chain includes a series of hashes, each produced from an unstructured input containing a current time stamp (i.e., current at the moment the receipt of such input or hash is created) and the previously created hash; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received plurality unstructured signal 128 are locally processed at apparatus 100 by a one-way function, e.g. a hash function as described above, and this hashed output data may be sent to a timestamping authority (TSA). The use of secure timestamps as described herein may enable primary controller 132 as described herein to instantiate attested time (i.e., the property that primary controller 132 incorporating a master clock may hash data, e.g., unstructured signal 128, along with the local timestamp of apparatus 100). Attested time may additionally incorporate attested identity, attested device architecture and other pieces of information identifying properties of the attesting device. In one embodiment, secure timestamp is generated by a trusted third party (TTP) that appends a timestamp to structured data package 136, applies the TSA private key to sign the hashed output data concatenated to the timestamp, and returns this signed, a.k.a. trusted timestamped data back to the listener device. Alternatively, or additionally, one or more additional participants, such as other verifying nodes within the network, may evaluate secure timestamp, or other party generating secure timestamp and/or perform threshold cryptography with a plurality of such parties, each of which may have performed an embodiment of method to produce a secure timestamp. In an embodiment, primary controller 132 or other parties authenticating digitally signed assertions, devices, and/or inputs (e.g., user credentials) may perform authentication at least in part by evaluating timeliness of entry and/or generation data as assessed against secure timestamp.

Still referring to FIG. 1, in some embodiments, structured data package 136 and/or unstructured signal 128 may be transmitted using a secure protocol. For example, a secure proof may be used to ensure the security and integrity of structured data package 136 during transmission and processing. A "secure proof," as used in this disclosure, is a protocol whereby an output is generated that demonstrates possession of a secret, such as device-specific secret, without demonstrating the entirety of the device-specific secret. In some embodiments, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, in a non-limiting example, secure proof as described herein may be implemented using a challenge-response protocol. In an embodiment, this may function as a one-time pad implementation; for instance, apparatus 100 may record a series of outputs ("responses") produced by a cryptographic algorithm or other trusted parties possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of structured data package 136; the key may be discarded for future use after a set period of time. In an embodiment, varied unstructured inputs include variations in operational parameters, such as sensor readings, user inputs, system alerts, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, primary control unit 136 may verify response by decrypting an encryption of challenge or of another data element using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, in some cases, secure proof may include a zero-knowledge proof, which may provide an output demonstrating possession of a secret while revealing none of the secret to a recipient of the structured data package 136; zero-knowledge proof may be information-theoretically secure, meaning that corresponding service unit with infinite computing power would be unable to determine secret from structured data package 136. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 1, Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 1, transmission of structured data package 136 may include sending structured data package 136 (or command) to apparatus 100 using a digital signature to authenticate the source of a "message" (i.e., provided element of data) and ensure that the message has not been altered during transmission. Such digital signature may act as a seal, verifying the message indeed comes from the legitimate primary controller 132. A "digital signature," as used herein, includes a secure proof of possession of a secret by a signing device, as performed on the message. In some cases, message may include an encrypted mathematical representation of a file or other set of data e.g., structured data package 136 using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if structured data package 136 is well-designed and implemented correctly, any alteration of the structured data package 136 may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any data structure.

Still referring to FIG. 1, in some embodiments, digital signatures may be combined with or incorporated in digital certificates to enhance the security and trustworthiness of communications within the networked system of equipment. In one embodiment, a digital certificate is a data structure that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. In a non-limiting example, digital certificate may be used to authenticate primary controller 132. In some cases, certificate may confirm that remote primary control unit is authorized to issue such structured data package 136.

Still referring to FIG. 1, in some embodiments, a third party such as a certificate authority (CA) may be available to verify that the possessor e.g., apparatus 100 of the private key is a particular entity; thus, if the certificate authority may be trusted, and the private key has not been stolen, the ability of an entity to produce a digital signature confirms the identity of the entity and links structured data package 136 to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that structured data package 136 has not been altered since the formation of the digital signature.

Still referring to FIG. 1, in some embodiments, structured data package 132 may include a malfunction datum, a target parameter value, and/or an unspecified command. In some embodiments, apparatus 100 may receive structured data package 136 including a malfunction datum. As used herein, a "malfunction datum" is a datum in a structured data package indicating that a malfunction has occurred or is at an increased chance of occurring, or that an action remedying or preventing a malfunction is to be taken. For example, a malfunction datum may include a datum indicating that one or more sensor output 120 are outside of a normal range. For example, unstructured signal 128 may include a datum indicating that low water pressure has been detected in a car wash pump, and structured data package 136 may include an instruction to disable the car wash pump and/or that a backup pump is to be activated. In some embodiments, apparatus 100 may receive structured data package 136 including a target parameter value. As used herein, a "target parameter value" is an instruction in a structured data package to modify a system such that a parameter gets closer to a specified value. For example, unstructured signal 128 may include data indicating that a first user interacted with a kiosk and selected a car wash of a specific type of vehicle, and apparatus 100 may receive structured data package 136 including an instruction to move car wash tunnel equipment to accommodate a vehicle of the relevant dimensions. In some embodiments, apparatus 100 may receive structured data package 136 including an unspecified command. As used herein, an "unspecified command" is an instruction in a structured data package to modify a system such that a specified result is achieved, which does not specify a device to be utilized in implementing the instruction. For example, unstructured signal 128 may include data indicating amounts of water used in the last several car washes, structured data package 136 may include an instruction to reduce the amount of water used in future car washes, without specifying which devices of a car wash tunnel are to have parameters changed in order to achieve this result.

Still referring to FIG. 1, primary controller 132 may communicate with apparatus 100, which may include a secondary controller, and may be a part of a plurality of secondary controllers. Apparatus 100 may receive sensor output 120 from sensor 124 and may transmit unstructured signal 128 to primary controller 132. System 100 as described herein may be implemented in a master-slave configuration. As used herein, a "master-slave configuration" is a configuration model of asymmetric communication, control, or both where one device, process, or both controls one or more other devices, processes, or both. In some embodiments, primary controller 132 may act as a master and apparatus 100 and/or other secondary controllers may act as slaves in such a relationship. In a non-limiting example, primary controller 132, functioning as a master device, may hold one or more central command and control responsibility for the entire network. For instance, primary controller 132 may aggregate and analyze data from all equipment and make strategic decisions affecting the entire network. This may include, but is not limited to, optimizing equipment's operational efficiency, resource allocation, job scheduling, and the like. In some cases, primary controller 132 may synchronize operations across all equipment, for example, and without limitation, primary controller 132 may send global commands and updates to a plurality of secondary control units including apparatus 100, which then implement these directives independently and locally.

Still referring to FIG. 1, in some cases, equipment may act as a slave to apparatus 100 and/or primary controller 132. In some cases, apparatus 100 may be more localized and responsible for a direct control, including, without limitation, day-to-day operations, of its equipment. In some cases, apparatus 100 may be configured to receive and execute an instruction or a set of instructions from primary controller 132. Exemplary instructions may include, without limitation, changes in one or more operational settings, execution of specific tasks, response to system-wide directives, and the like.

Still referring to FIG. 1, in some embodiments, apparatus 100 may be associated with a geographic identifier. As used in this disclosure, a "geographic identifier" is a unique identifier or data attribute that links a computing device to a specific geographic location, area, or zone. Such geographic identifier may be used to determine the physical location of equipment and/or computing devices within a larger networked system. In some embodiments, geographic identifier may include GPS coordinates, RFID tags, location-specific barcodes, predefined zone codes within a facility, and/or the like. In some cases, geographic identifier may be static, representing a fixed location, or in some cases dynamic, reflecting a movement of mobile equipment. In a non-limiting example, apparatus 100 may be configured to adjust corresponding equipment's operations based on geographic identifier. For example, apparatus 100 may modify behaviors, settings, or operational parameters of corresponding equipment when it is at a certain geographic location, or in other cases, multiple items of equipment associated with a specific geographic identifier may receive commands or data from primary controller 132 and/or apparatus 100 while the rest of a plurality of equipment items remain uninformed.

Still referring to FIG. 1, in some embodiments, apparatus 100 may identify an equipment command 140 as a function of structured data package 136. As used herein, an "equipment command" is an instruction to utilize a functionality of equipment. In non-limiting examples, equipment commands may include instructions to move equipment into a certain position, turn equipment on or off, or adjust a parameter with which equipment operates. Such a parameter may include, in non-limiting examples, a water flow rate, a blower fan speed, a temperature setting of a heating or cooling device, and a speed of a conveyer belt. Apparatus 100 may use secondary controller output identifier 144 to identify equipment command 140. Secondary controller output identifier 144 may include a mechanism for determining structured data package 136, such as lookup table 148, rule based engine 152, equipment command machine learning model 156, and equipment command user input 160.

Still referring to FIG. 1, in some embodiments, apparatus 100 may determine equipment command 140 using a lookup table 148. A lookup table may include an array which maps input values to output values. Input values may include structured data package 136 and/or an element of a structured data package. An output value may include, in non-limiting examples, a set of code and/or a reference to a set of code. In a non-limiting example, such a set of code may include code which implements an instruction of structured data package 136.

Still referring to FIG. 1, in some embodiments, apparatus 100 may determine equipment command 140 using a rule based engine 152. A rule based engine may include a selection of equipment command 140 based on a set of predefined rules which determine equipment command 140 based on data in structured data package 136. For example, structured data package 136 may indicate that a vehicle is off a track, and rule based engine 152 may include a rule specifying that, if a vehicle is off a track, all cleaning and drying devices of a car wash tunnel are to stop, and a conveyer belt of a car wash tunnel is to stop.

Still referring to FIG. 1, in some embodiments, apparatus 100 may use a lookup table and/or a rule based engine as part of selection of equipment command 140. For example, lookup table 148 and/or rule based engine 152 may determine equipment command 140 for common scenarios in which predefined rules or input output associations are appropriate, while complicated, less common scenarios may be determined using a different process, such as equipment command machine learning model 156 and/or equipment command user input 160.

Still referring to FIG. 1, in some embodiments, apparatus 100 may determine equipment command 140 using equipment command machine learning model 156. In some embodiments, equipment command machine learning model 156 may be trained using a supervised learning algorithm. Equipment command machine learning model 156 may include, for example, a classifier, equipment command machine learning model 156 may be trained on a training dataset including example structured data packages, associated with example equipment commands. Such a training dataset may be obtained by, for example, structured data packages 136 and equipment commands produced using an equipment command user input system as described below. Once equipment command machine learning model 156 is trained, it may be used to determine equipment command 140. Apparatus 100 may input structured data package 136 into equipment command machine learning model 156, and apparatus 100 may receive equipment command 140 from the model.

Still referring to FIG. 1, in some embodiments, equipment command machine learning model 156 may be trained using a reinforcement learning algorithm. For example, equipment command machine learning model 156 may be given inputs such as structured data package 136, and equipment command machine learning model 156 may be adjusted based on a cost function, where the cost function is based on the model's output. Such a cost function may take into account, for example, user feedback such as feedback by operators of a facility in which equipment to which equipment command 140 is sent, and/or metrics associated with operating status of equipment. For example, a cost function may take into account whether, after equipment command 140, equipment metrics read by sensor 124 indicate that the equipment is operating at normal levels. In another example, a cost function may be based on a manual assessment of structured data package 136 by a human.

Still referring to FIG. 1, in some embodiments, apparatus 100 may determine equipment command 140 using equipment command user input 160. As used herein, an "equipment command user input" is a datum generated as a function of a user input, where the datum is used to determine an equipment command. Equipment command user input 160 may include an input from a user viewing structured data package 136 and/or a datum of structured data package 136. In some embodiments, apparatus 100 may display structured data package 136 and/or a datum of structured data package 136 to a user. For example, a visual element describing structured data package 136 and/or a datum of structured data package 136 may be generated as a function of structured data package 136 and displayed to a user. Display to a user may include display using user interface 164 of user device 168.

Still referring to FIG. 1, as described above, apparatus 100 may determine a visual element data structure. Visual element data structure may include and/or specify a visual element to be displayed to a user. A visual element may be displayed to a user using, for example, user interface 164 of user device 168. As used herein, a "visual element" is a datum that is displayed visually to a user. In some embodiments, a visual element data structure may include a rule for displaying visual element. In some embodiments, a visual element data structure may be determined as a function of structured data package 136. In some embodiments, a visual element data structure may be determined as a function of an item from the list consisting of sensor 124, sensor output 120, unstructured signal 128, primary controller 132, structured data package 136, a previous user response, and an output of lookup table 148, rule based engine 152, and equipment command machine learning model 156. In a non-limiting example, a visual element data structure may be generated such that visual element describing or highlighting structured data package 136 is displayed to a user. In another non-limiting example, a visual element data structure may display a datum within structured data package 136, as well as a normal range for the datum.

Still referring to FIG. 1, in some embodiments, visual elements may include one or more elements of text, images, shapes, charts, particle effects, interactable features, and the like. For example, a visual element may include a text description of a variable of structured data package 136, alongside an interactive element such as a button, which may be used to adjust operation of equipment.

Still referring to FIG. 1, a visual element data structure may include rules governing if or when visual element is displayed. In a non-limiting example, a visual element data structure may include a rule causing a visual element describing structured data package 136 to be displayed when a user selects structured data package 136 using a graphical user interface (GUI).

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). For example, by default data within normal ranges may be hidden, while data outside of normal ranges may be displayed. A visual element data structure may rank data or assign numerical values to them. For example, data far outside normal ranges may be ranked higher than data inside normal ranges or closer to a normal range. A visual element data structure may apply rules based on a comparison between a ranking or numerical value and a threshold. Rankings, numerical values, categories, and the like may be used to set visual element data structure rules. Similarly, rankings, numerical values, categories, and the like may be applied to visual elements, and visual elements may be applied based on them. For example, visual elements above a certain ranking may be displayed.

Still referring to FIG. 1, in some embodiments, visual element may be interacted with. For example, visual element may include an interface, such as a button or menu. In some embodiments, visual element may be interacted with using a user device such as a smartphone.

Still referring to FIG. 1, in some embodiments, apparatus 100 may transmit visual element data structure to user device 168. In some embodiments, apparatus 100 may include at least a processor 104 and a memory 108 communicatively connected to the at least processor 104, the memory 108 containing instructions 112 configuring the at least processor 104 to transmit visual element data structure to user device 168. In some embodiments, visual element data structure may configure user device 168 to display visual element. In some embodiments, visual element data structure may cause an event handler to be triggered in an application of user device 168 such as a web browser. In some embodiments, triggering of an event handler may cause a change in an application of user device 168 such as display of visual element.

Still referring to FIG. 1, in some embodiments, apparatus 100 may transmit visual element to a display. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, in some embodiments, apparatus 100 may apply different implementations of secondary controller output identifier 144 based on structured data package 136. For example, lookup table 148 and/or rule based engine 152 may be used in situations in which data of structured data package 136 cleanly falls into a category for which an output has been predetermined. However, in some embodiments, structured data package 136 may include multiple elements of data with competing results, multiple structured data packages 136 may suggest competing results, or structured data package 136 may otherwise include obscure data for which outcomes have not been predetermined. In some embodiments, apparatus 100 may apply equipment command machine learning model 156 and/or equipment command user input 160 in a scenario in which lookup table 148 and/or rule based engine 152 do not provide a single cohesive set of equipment commands 140.

Still referring to FIG. 1, in some embodiments, no equipment commands may be generated, a single equipment command may be generated, or multiple equipment commands may be generated. For example, in some embodiments, apparatus 100 may determine that equipment is already running at appropriate settings and may not produce equipment command 140. In some embodiments, multiple equipment commands 140 may be generated. For example, structured data package 136 may include data indicating that a vehicle is off a track, and in response, a first equipment command stopping a conveyer belt may be generated, a second equipment command stopping a pump may be generated, and a third equipment command stopping a blower may be generated.

Still referring to FIG. 1, in some embodiments, one or more sets of equipment commands may be generated, such that each equipment command of the equipment command set is run as a group. For example, equipment command machine learning model 156 may be trained to select a set of equipment commands, rather than outputting combinations of equipment commands from a larger pool. In some embodiments, reducing the number of possible outputs in this way may improve efficiency of training equipment command machine learning model 156 to a point where it produces sufficient outputs.

Still referring to FIG. 1, in some embodiments, apparatus 100 may selectively implement structured data package 136. As used herein, "selective implementation" is targeted application of one or more of a plurality of operational adjustments based on a structured data package. As used herein, an "operational adjustment" is a modification made to operation of equipment. In some embodiments, operational adjustment may include implementable (programming) code instructing apparatus 100 how to respond or adapt based on structured data package 136. In some embodiments, selective implementation of plurality of operational adjustments may involve selecting and executing only those operational adjustments that are deemed relevant and necessary for specific equipment, rather than applying a blanket approach across all secondary control units or service units. In other embodiments, apparatus 100 may implement none of plurality of operational adjustments. In some cases, one or more operational adjustments of plurality of operational adjustments may be selected based on a manual input from user e.g., an operator. In some cases, apparatus 100 may be automatically discerned one or more operational adjustments upon receipt of structured data package 136 using one or more machine learning process as described herein. In some cases, operational adjustments may be embedded within structured data package 136 as described above. In some cases, apparatus 100 may be configured to identify one or more operational adjustments of plurality of adjustments as a function of configuration category specified within structured data package received from primary controller 132.

Still referring to FIG. 1, in a non-limiting embodiment, operational adjustment may include modifications of operational parameters. Apparatus 100, upon implanting such operational adjustment may be configured to, for instance, changing the water pressure or temperature settings (in a custom wash) or projecting certain digital content at certain areas of the vehicle during the wash, according to configuration settings. In such embodiment, changes or modifications may need to be authorized or verified for one or more security, safety, or otherwise compliance purposes. Operational adjustments may be contingent upon a successful verification or a positive identification of user's identity or authority. Additionally, or alternatively, in cases where equipment items are spread across different geographic locations, modifications of operational parameters may be made based on local environmental conditions or regulations retrieved from trusted data sources using geographic identifier listed in structured data package 136, for example, and without limitation, in areas with water scarcity, primary controller 132 may send structured data package suggesting adjustments, or in other cases, apparatus 100 may be configured to reduce water usage specifically to service units in those regions accordingly. Further, in some cases, operational adjustment may further include one or more adjustments to vehicle care command (i.e., an instruction that directs the operation of a service unit to perform vehicle care) as described in U.S. patent application Ser. No. 18/196, 205.

Still referring to FIG. 1, in some embodiments, operational adjustment may also include equipment-specific adjustment. In some cases, different locations may include varying types of equipment with distinct maintenance needs. In some instances, structured data package 136 may include one or more configuration settings such as, without limitation, specific maintenance schedules or protocols tailored to the type of equipment each service unit possesses. In one or more embodiments, structured data package 136 may indicate increased wear or potential issues in certain equipment of service units, one or more operational adjustment such as, without limitation, scheduling preventive maintenance may be determined at apparatus 100 based on such structured data package 136. In a non-limiting example, apparatus 100 may automatically generate, as a function of structured data package, a maintenance ticket and adjust the service unit's operation schedule accordingly to accommodate the maintenance window. In yet another non-limiting embodiment, operational adjustments may also include, in case of an emergency or safety issue raised by configuration category such as a chemical spill or equipment malfunction, shutting down affected unit, activating one or more unit's safety features, alerting human supervisors, and/or the like. Other exemplary operational adjustments may include, without limitation, implementing energy saving measures during peak hours by reducing lighting in non-essential areas or optimizing the user of equipment, altering service process based on identified trend for improved customer experience, download and install specific version or updates of software to improve performance or add new features, adjust the mix or amount of cleaning chemicals used based on vehicle data, and/or the like. As a person skilled in the art, upon reviewing the entirety of this disclosure, will be aware of various operational adjustments may be selected and then implemented by apparatus 100 as described herein.

Still referring to FIG. 1, in some embodiments, apparatus 100 may initiate equipment command 140 by transmitting the equipment command to an equipment controller 172. As used herein, an "equipment controller" is a computing device which operates equipment and is the lowest level computing device in a hierarchy of a larger networked system. For example, an equipment controller may include a basic computing device local to a piece of equipment responsible for receiving equipment settings and applying those settings. In some embodiments, implementation of equipment command 140 configures equipment controller 172 to utilize a function of equipment associated with equipment controller 172. In a non-limiting example, equipment command 140 may be transmitted to a blower controller, such that the blower controller configures a blower to increase air speed. In another non-limiting example, equipment command 140 may be transmitted to a conveyer belt controller, such that the conveyer belt stops. In some embodiments, equipment controlled by equipment controller 172 includes car wash tunnel equipment. As described above, various types of equipment may be operated using apparatus 100 and/or processes described herein.

Still referring to FIG. 1, in some embodiments, equipment controller 172 may include a localized controller or processor that directly interfaces with and control individual components or processes within respective equipment. For instance, and without limitation, equipment controller 172 may include a microcontroller of a particular equipment and apparatus 100. In some cases, when apparatus 100 identifies the need for one or more operational adjustments based on analysis of structured data package 136, apparatus 100 may be configured to communicate such need to one or more corresponding equipment controller 172. In these cases, selected operational adjustments may be conveyed as high-level directives i.e., configuration categories, which apparatus 100 interprets and translates into more specific instructions such as configuration settings and/or instructions of selected operational adjustments. Equipment controller 172 may be responsible for direct control of specific operational parameters within their respective equipment. This may include, without limitation, settings on machinery, adjustments in resource allocation, changes in process flows, and/or the like.

Still referring to FIG. 1, In an embodiment, primary controller 132 may classify unstructured signal 128 into a configuration category and generate structured data package 136 by structuring unstructured signal 128 as a function of the classified configuration category. As used in this disclosure, a "configuration category" is a high-level operational directive or strategy. For example, a configuration category may include an overview or generalized perspective that focuses on broader aspect rather than detailed, specific elements. In a non-limiting example, configuration category may be configured as an "action-oriented guidance" for apparatus 100 and equipment, for example, and without limitation, each configuration category may include, or at least be associated with a set of recommended actions or operational adjustments. An "operational adjustment," for the purpose of this disclosure, are changes or modifications made to the processes, procedures, or functioning of corresponding service unit. An equipment command may include an operational adjustment. In some embodiments, operational adjustment may include implementable (programming) code instructing secondary control unit how to respond or adapt based on structured data package 136.

Still referring to FIG. 1, in a non-limiting example, configuration category may indicate a high-level strategic decision rather than granular operational details e.g., specific changes or modifications that are required by apparatus 100. In some cases, configuration category may provide a framework or overall approach within which specific tasks may be executed by apparatus 100 and equipment controller 172. In a non-limiting example, structured data package 136 may facilitate decentralized decision making i.e., primary controller 132 may set one or more configuration categories, empowering connected secondary controllers such as apparatus 100 to develop and implement specific, localized response e.g., operational adjustment. Examples of configuration categories may include, without limitation, preventive maintenance, operational efficiency optimization, emergency response, and/or the like as described in more detail below.

Still referring to FIG. 1, in a non-limiting embodiment, primary controller 132 may determine configuration category as "preventive maintenance" based on certain structured data package 136, wherein such configuration category may involve one or more operational adjustments aimed at preventing equipment failures before they occur. In a non-limiting example, primary controller 132 may identify preventive maintenance configuration category when one or more data entries, data blocks, or data clusters indicting a certain degree of wear and tear (exceeding a pre-defined threshold) or nearing the end of on-record lifecycle of certain components. For instance, and without limitation, if plurality of unstructured inputs include sensor data from a car wash service unit shows that water pumps are vibrating beyond normal threshold, primary controller 132 may classify this as a preventive maintenance need, prompting secondary control unit to schedule maintenance for the pumps. In another non-limiting embodiment, primary controller 132 may determine configuration category as "operational efficiency optimization" based on certain structured data package 136, wherein such configuration category may focus on improving the overall efficiency of operations. In some cases, operational adjustments such as, without limitation, reconfiguration of existing processes and/or operational parameters, reducing resource consumptions, throughput enhancement, and/or the like may be associated with operational efficiency optimization configuration category. Operational efficiency optimization configuration category may be selected when remote primary controller 132 detect data showing suboptimal resource use or prolonged service time. In a non-limiting example, if plurality of unstructured inputs shows that certain car wash cycles are taking longer than average, consuming extra water and/or electricity, primary controller 132 may initiate operational efficiency optimization configuration category to adjust the operational parameters e.g., cycle parameters for improved service efficiency. In some cases, primary controller 132 may determine configuration category as "emergency response" based on certain structured data package 136, for example, and without limitation, structured data package containing data indicative of one or more emergency situations, on-site incidents, system errors, or device failure such as sudden equipment shutdown, malfunction, safety system trigger, and/or any other unplanned events that require immediate actions. In a non-limiting example, if a chemical leak is detected in a service unit, primary controller 132 may classify this as an emergency response situation, instructing secondary control unit to initiate emergency protocols, such as shutting shown related service units in affected area and alerting maintenance staff. Additionally, or alternatively, other exemplary embodiment of configuration category may further include, without limitation, quality assurance (QA), unit upgrades, customer relationship management (CRM), and/or the like. As a person skilled in the art, upon reviewing the entirety of this disclosure, will be aware the variety of configuration categories and their importance in larger networked system as described herein.

Still referring to FIG. 1, in a non-limiting embodiment, primary controller 132 may be configured to classify unstructured signal 128 or structured data packages into a configuration category such as, without limitation, preventive maintenance, operational efficiency optimization, emergency response, or any other configuration category as listed above. In some cases, classifying unstructured signal 128 or structured data packages may include training a configuration category classifier, using configuration category training data, wherein the configuration category training data may include a plurality of example unstructured inputs or structured data packages correlated to a plurality of example configuration categories, and classifying unstructured signal 128 or structured data packages into the configuration category using the trained configuration category classifier. In some cases, configuration category training data may also include plurality of example operational parameter and/or example additional unstructured inputs examples correlated to plurality of example configuration categories. Additionally, or alternatively, primary controller 132 may configure machine learning module to iteratively train configuration category classifier and/or any other machine learning models as described herein based on classified configuration category to improve its predictive accuracy, for example, and without limitation, outputs of configuration category classifier may be added to configuration category training data to generate a new set of training data. Configuration category classifier may be retrained using the new set of training data.

Still referring to FIG. 1, in some embodiments, generating structured data package 136 may further include determining a plurality of configuration settings associated with configuration category as a function of plurality of operational parameters and incorporating the determined plurality of configuration settings into structured data package 136 to facilitate plurality of operational adjustments in apparatus 100. As used in this disclosure, "configuration setting" is a specific parameter or operational guideline that is determined and potentially applied within a particular configuration category to achieve a desired outcome. In a non-limiting example, plurality of configuration settings may be derived from processing of unstructured signal 128, generating of structured data package 136, and/or classification of configuration category as described above. In one or more embodiments, plurality of configuration settings may include one or more actionable or configurable parameters or rules set by primary controller 132 for apparatus 100 to implement. In a non-limiting example, plurality of configuration settings may include detailed instructions or adjustments that operationalize high-level operational directive specified by configuration category as described above. Exemplary configuration settings may include, without limitation, machine settings, maintenance checks, part replacements, operational parameter adjustments, resource reallocation, safety protocols, operation rerouting, sensor calibrating, and/or the like.

Still referring to FIG. 1, in some embodiments, identifying equipment command 140 may include classifying a configuration category into an implementation category, and identifying equipment command 140 as a function of the implementation category. As used herein, an "implementation category" is a subcategory of a configuration category according to the function of a command from a primary controller. For example, a command in a configuration category may instruct apparatus 100 to replace a part, and an implementation category may be associated with whether the part replacement is to be part of regular maintenance or a dedicated, previously unscheduled, maintenance action. In another example, a command in a configuration category may instruct apparatus 100 to calibrate a sensor, and implementation category may be associated with whether other like sensors are to be calibrated simultaneously. In some embodiments, an implementation category may be determined using a component of secondary controller output identifier 144, such as a lookup table, a rule based engine, an equipment command user input, and an equipment command machine learning model.

Still referring to FIG. 1, in some embodiments, an implementation classifier may be used to determine an implementation category. Implementation classifier may be trained using a supervised learning algorithm. Implementation classifier may include a classifier. Implementation classifier may be trained on a training dataset including example configuration categories, associated with example implementation categories. Such a training dataset may be obtained based on, for example, user input. Once implementation classifier is trained, it may be used to determine implementation categories. Apparatus 100 may input configuration category into implementation classifier and apparatus 100 may receive implementation category from the model.

Still referring to FIG. 1, in some embodiments, computing device 116 may transmit unstructured signal 128 comprising sensor output 120 to primary controller 132 after transmitting equipment command 140 to equipment controller 172. For example, computing device 116 may transmit a first unstructured signal comprising a first sensor output to primary controller 132, may receive structured data package 136 in response, may determine equipment command 140 as a function of structured data package 136, and may transmit a second unstructured signal comprising a second sensor output 120 to primary controller 132 after transmitting equipment command 140 to equipment controller 172. In some embodiments, such second sensor output may be detected by sensor 124 and/or received by computing device 116 after computing device 116 transmits equipment command 140 to equipment controller 172.

Still referring to FIG. 1, in some embodiments, transmission of unstructured signal 128 comprising sensor output 120 to primary controller 132 after transmitting equipment command 140 to equipment controller 172 may allow primary controller to determine whether any additional actions are necessary. In a non-limiting example, a first sensor output may indicate that water pressure in a pump is lower than usual, and primary controller may transmit to computing device 116 a structured data package configuring computing device 116 to determine an equipment command meant to rectify the situation. In this example, subsequent sensor outputs may be transmitted to primary controller 132 in the form of an unstructured signal and may be used to determine whether the equipment command was effective in rectifying the situation. For example, primary controller 132 may compare subsequent sensor outputs to historical data indicating whether or not additional repairs will be needed in the short term.

Still referring to FIG. 1, in some embodiments, transmission of unstructured signal 128 comprising sensor output 120 to primary controller 132 after transmitting equipment command 140 to equipment controller 172 may allow primary controller to generate a model which may be used to improve generation of equipment commands in the future. For example, primary controller 132 may, for a particular issue category, track equipment commands 140 generated by various computing devices and effectiveness of equipment commands generated by such computing devices. In some embodiments, this information may allow primary controller 132 to identify an improved strategy for determining equipment commands. Primary controller 132 may then cause an update in computing device 116 configuring computing device 116 to determine equipment commands for the relevant issue category using the improved strategy.

Still referring to FIG. 1, in some embodiments, apparatus 100 and primary controller 132 may be physically in the same location. In some embodiments, apparatus 100 and primary controller 132 may be physically in different locations. As described above, in some embodiments, a single primary controller 132 may interact with multiple secondary controllers as described herein with respect to primary controller 132 interactions with apparatus 100. Primary controller 132 may perform tasks including, in non-limiting examples, data structuring, and producing high level instructions for apparatus 100. In some embodiments, primary controller 132 may perform computationally intensive tasks, such as training and implementation of machine learning models, such as a machine vision model for determining whether a vehicle is on a track as described above. In some embodiments, transmission of unstructured signal 128 for structuring and/or processing at primary controller, and receipt of structured data package 136 may improve efficiency. For example, central structuring of information may remove a necessity to have a computing device capable of this at each location. Such a computing device may need sufficient processing power, software, and may need maintenance, which may be avoided by central data structuring. In another example, central data structuring and/or processing may allow updates to such software to be implemented in a single location, which may increase speed and/or reliability of such updates being implemented.

Still referring to FIG. 1, in some embodiments, central structuring and/or processing of data may allow primary controller 132 to collect data. For example, a primary controller 132 and/or an associated computing device may record data transmitted to and/or from primary controller 132 and may detect patterns in such data. For example, primary controller 132 may determine from data associated with several secondary controllers that a certain data pattern produced by a sensor increases likelihood of a malfunction. Primary controller may then be updated to detect such data pattern and produce structured data package 136 indicating that a relevant piece of equipment is in need of maintenance upon receiving such a data pattern.

Still referring to FIG. 1, in some embodiments, local implementation of central decision making may improve efficiency, as the specific equipment used in local facilities may vary in, for example, the types of equipment available, as well as their manufacturer and version. Equipment commands of apparatus 100 may be optimized for local equipment and/or equipment controllers.

Still referring to FIG. 1, in some embodiments, filtering of data prior to transmission of unstructured signal 128, and/or implementation of commands by apparatus 100 as a function of structured data package 136 may reduce an amount of data which is communicated to primary controller 132. Such a reduction in data traffic may place lower demands on devices responsible for such communications and on communication networks.

Figure 2:
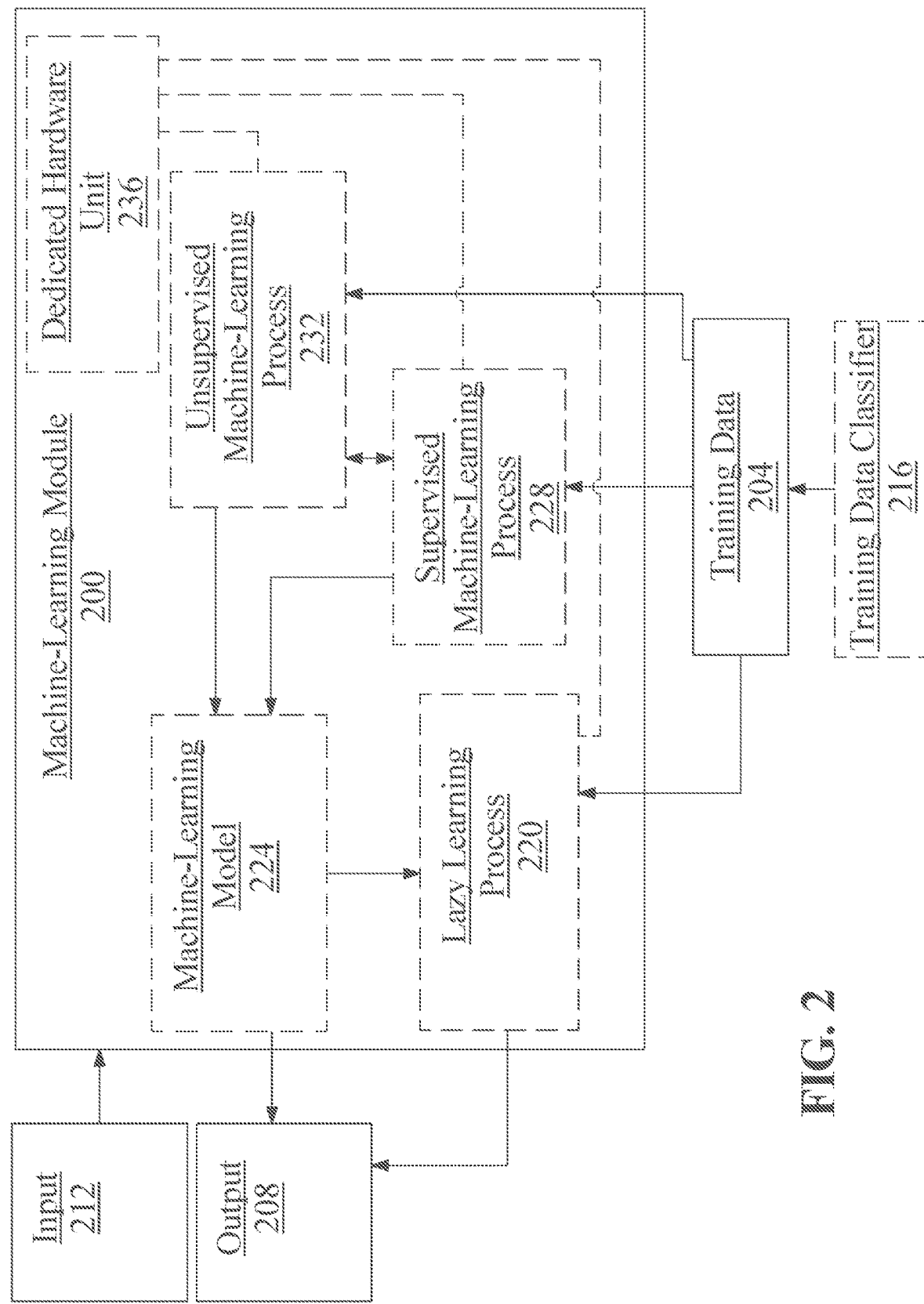
FIG. 2 is a box diagram of an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, training data may correlate structured data package with equipment command.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to an equipment command implemented using a particular piece of equipment.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include structured data packages as described above as inputs, equipment commands as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods.

Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

With continued reference to FIG. 2, apparatus 100 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 2, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; apparatus 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 3:
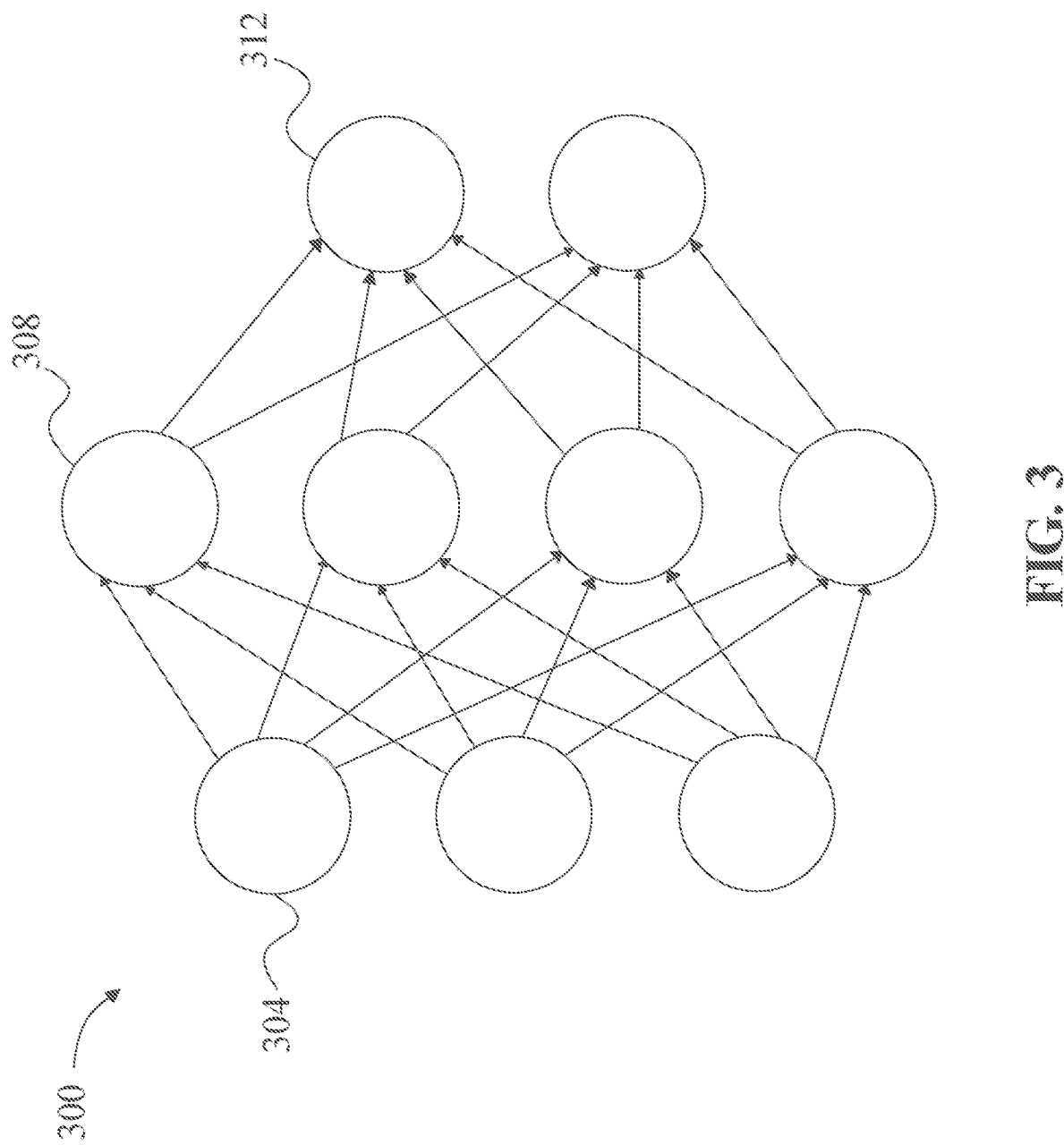
FIG. 3 is a diagram of an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
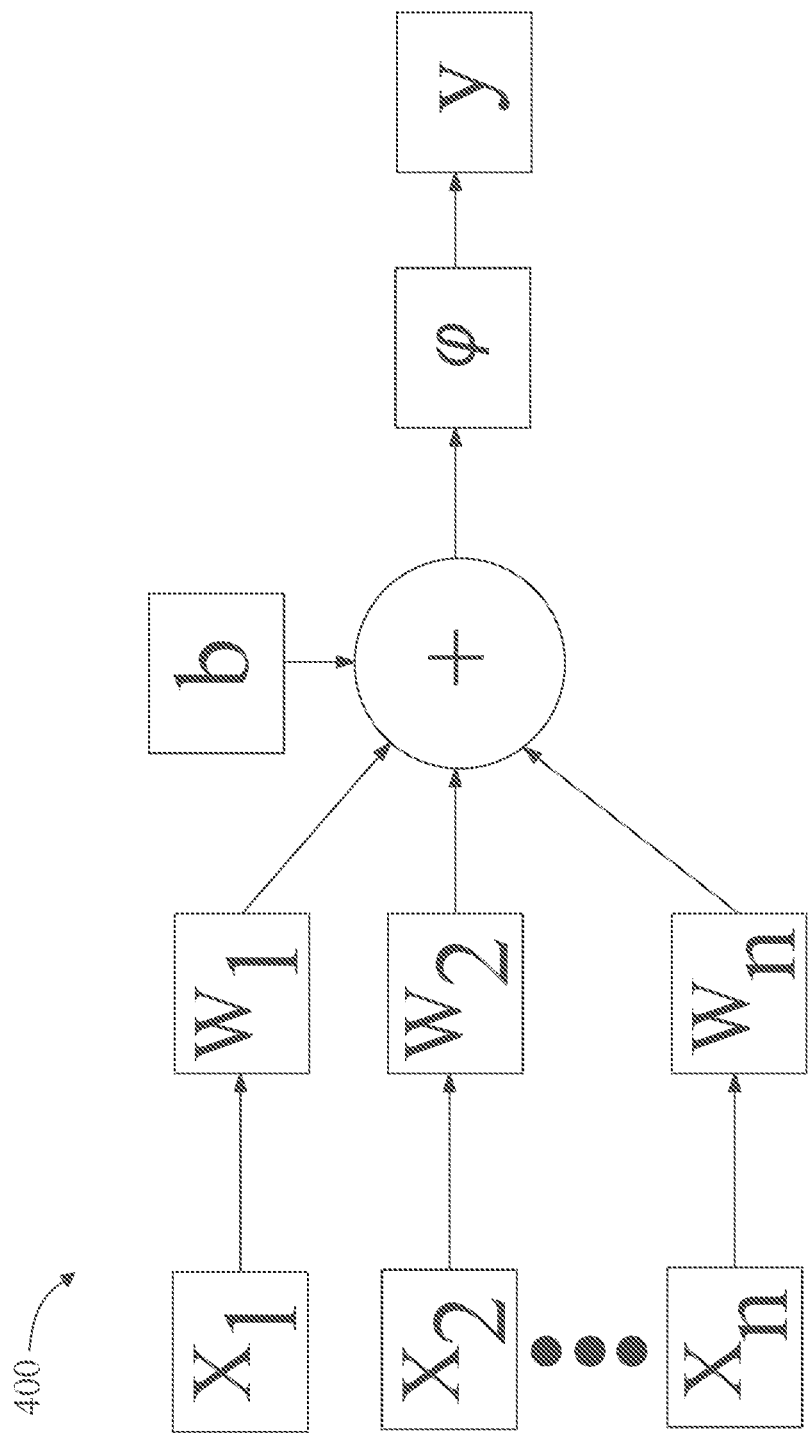
FIG. 4 is a diagram of an exemplary neural network node.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 4, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 4, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 5:
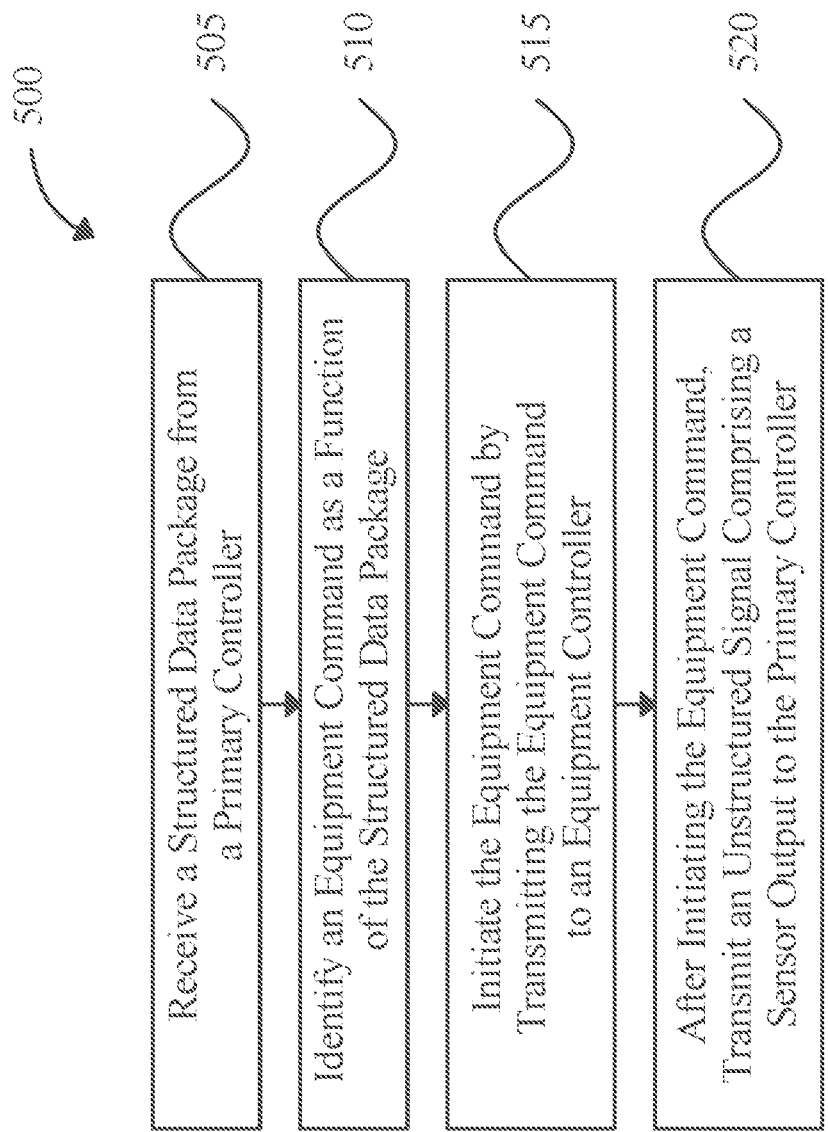
FIG. 5 is a diagram depicting an exemplary method of a command for an equipment controller.

Referring now to FIG. 5, an exemplary embodiment of method 500 of a command for an equipment controller is illustrated. One or more steps if method 500 may be implemented, without limitation, as described with reference to other figures. One or more steps of method 500 may be implemented, without limitation, using at least a processor.

Still referring to FIG. 5, in some embodiments, method 500 may include receiving a structured data package from a primary controller 505. In some embodiments, the structured data package comprises a malfunction datum. In some embodiments, the structured data package comprises a target parameter value.

Still referring to FIG. 5, in some embodiments, method 500 may include identifying an equipment command as a function of the structured data package 510. In some embodiments, the equipment command is identified using a lookup table. In some embodiments, the equipment command is identified using a rule based engine. In some embodiments, the equipment command is identified using an equipment command machine learning model. In some embodiments, the equipment command is identified by receiving an equipment command user input from the user.

Still referring to FIG. 5, in some embodiments, method 500 may include initiating the equipment command by transmitting the equipment command to an equipment controller 515. In some embodiments, the equipment command configures the equipment controller to utilize a function of equipment associated with the equipment controller. In some embodiments, the equipment comprises car wash tunnel equipment.

Still referring to FIG. 5, in some embodiments, method 500 may include, after initiating the equipment command, transmitting an unstructured signal comprising a sensor output to the primary controller 520.

Still referring to FIG. 5, in some embodiments, method 500 may further include transmitting to the primary controller unstructured data indicating a status of a system associated with the equipment. In some embodiments, method 500 may further include transmitting an application programming interface (API) request to the primary controller.

Figure 6:
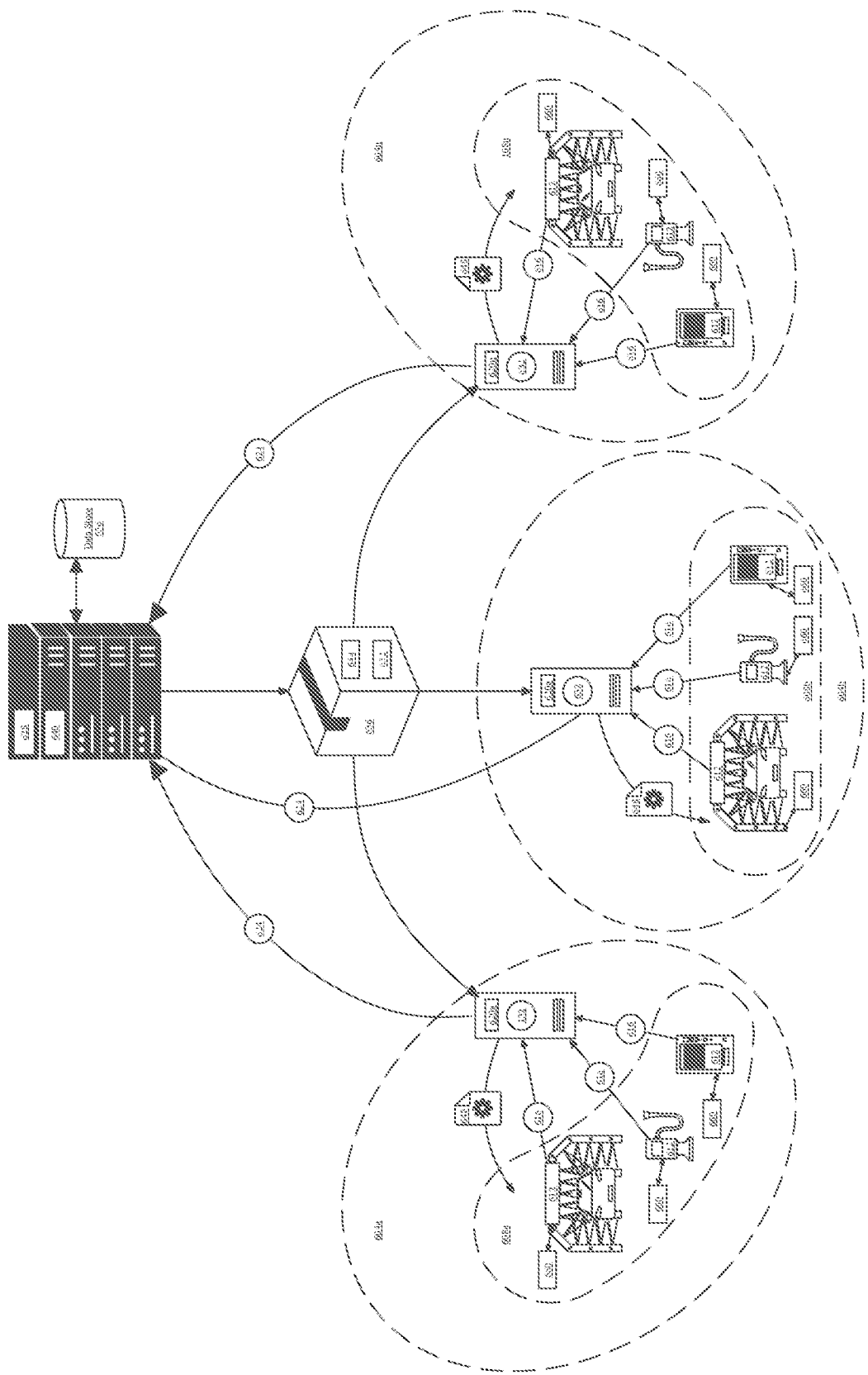
FIG. 6 is a diagram depicting an exemplary system for a command for an equipment controller.

Referring now to FIG. 6, a system including a plurality of computing devices is depicted. A system may include one or more service units, such as service units 604*a*, 604*b*, and 604*n*. As used herein, "service units" are individual operational components or devices within a larger networked system, each designed to perform specific functions or services. A service unit may be associated with one or more vehicle care devices such as plurality of vehicle care devices 608*a*, 608*b*, and 608*n*. A vehicle care device may be associated with a sensor 612. A computing device 620 may receive an operational parameter 616 from a sensor. Computing device 620 may generate an unstructured signal 624 and may transmit the unstructured signal 624 to a primary controller 628. Computing device 620 may be associated with a geographic identifier 632. Primary controller 628 may transmit structured data package 636 to computing device 620. Data aggregator 640 may be used to aggregate a plurality of unstructured signals 624 in order to generate structured data package 636. Primary controller 632 may classify unstructured signal 624 into a configuration category 644. A configuration category may include an operational adjustment 648. Structured data package 636 may include one or more configuration settings 652. One or more variables described herein such as structured data package 636 and/or unstructured signal 624 may be stored in data store 656. Computing device 620 may provide instructions to one or more equipment controllers 660.

Figure 7:
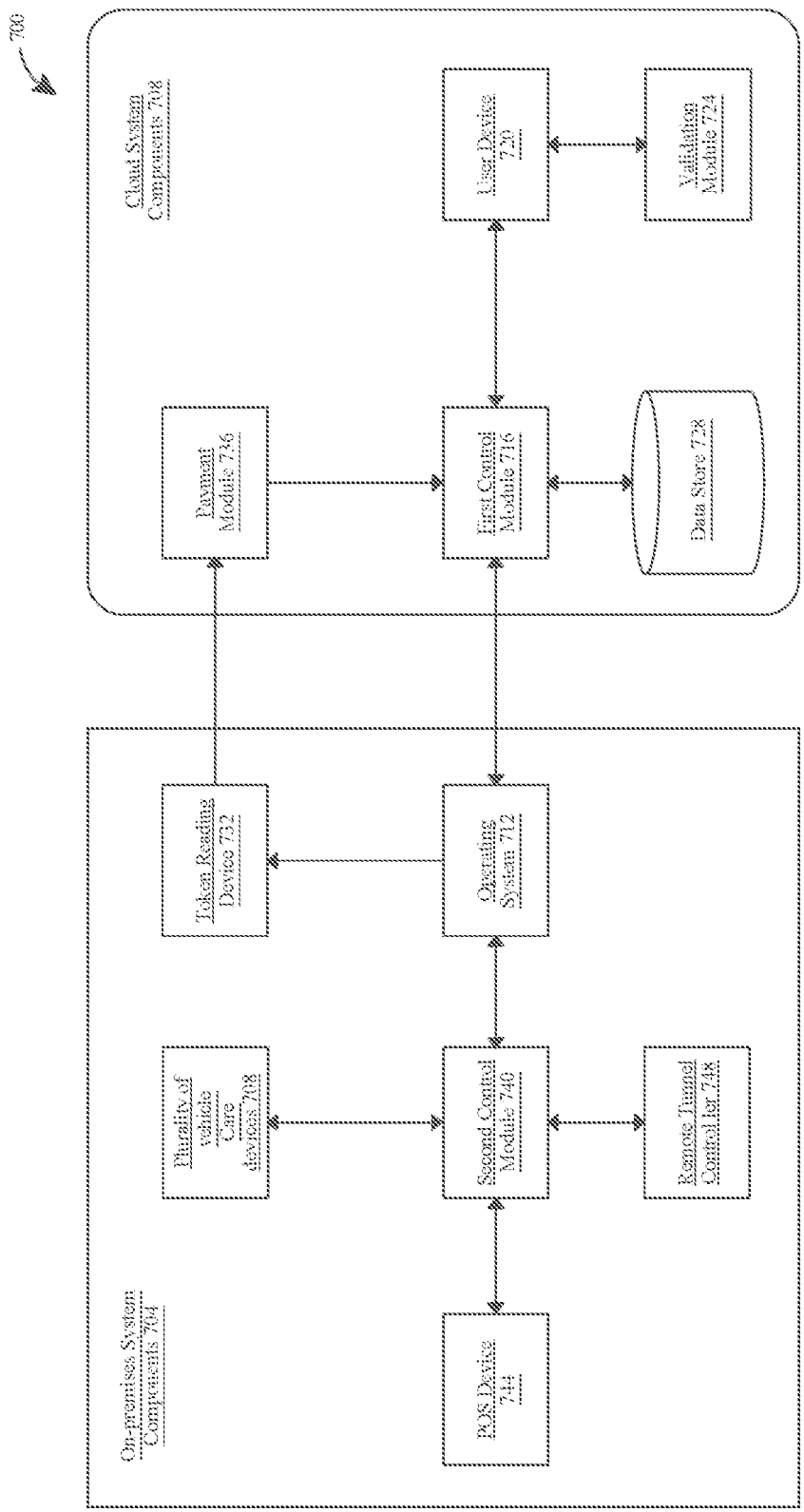
FIG. 7 is a diagram depicting an exemplary system architecture for managing and controlling a network of distributed service units.

Referring now to FIG. 7, a high-level system architecture 700 for managing and controlling a network of distributed service units is illustrated. System architecture 700 may include plurality of on-premises system components 704. As used in this disclosure, "on-premises system components" are components (e.g., computing infrastructure, software, or hardware) that are installed, hosted, and maintained within physical location of vehicle care site. In a non-limiting example, service unit and components thereof may be on-premises system components. In an embodiment, vehicle care site may be responsible for the management, maintenance, security, and operation of plurality of on-premises system components 704. Additionally, or alternatively, system architecture 700 may include plurality of cloud system components 708. As used in this disclosure, "cloud system components" are components (e.g., computing infrastructure, software, or hardware) that are installed, hosted, and maintained on cloud environment as described above with reference to FIG. 1. In a non-limiting example, remote primary control unit may be implemented as a cloud system component.

Still referring to FIG. 7, system architecture 700 may include an operating system 712. As used in this disclosure, an "operating system" is a fundamental software that manages and controls various system components as described in this disclosure such as secondary control unit, plurality of service units, and/or the like. In an embodiment, operating system 712 may be responsible for executing any processing steps as described in this disclosure. In a non-limiting example, operating system 712 may allocate system resources (e.g., processing power, memory, and/or storage) among various system components, manage the implementation of operational adjustments, and coordinating the communication between primary control unit and secondary control units.

Still referring to FIG. 7, operating system 712 may be communicate with a first control module 716, wherein the first control module 716 (e.g., remote primary control unit) may be a control unit hosted on cloud environment. In some cases, one or more user device 720 may be communicate with first control module 716. A "user device," for the purpose of this disclosure, is any additional computing device used by user to access and/or interact with digital content or services, such as a mobile device, laptop, desktop computer, or the like. In a non-limiting embodiment, user device 720 may be a computer and/or smart phone operated by a user in a remote location. In a non-limiting example, user may use user device 720 for user authentication to gain access to vehicle care site and/or plurality of vehicle care devices within the vehicle care site. User device 720 may allow user to enter user input containing, for example, one or more selection of operational adjustments. In some cases, user input may be verified using a validation module 724, wherein the "validation module," for the purpose of this disclosure, is a component responsible for validating and/or verifying a given credential, a certification, or otherwise an entitlement. In a non-limiting example, validation module 724 as described herein may be consistent with any validation module described in U.S. patent application Ser. No. 18/196,205. In some cases, validation module 724 may be a cloud system component; for instance, and without limitation, validation module 724 may include a cloud identify provider (IDP) configured to delivers identity and access management (IAM) functionality as a SaaS. First control module 716 may be communicate with data store 728, such as any data store as described herein, to enable validation module 724 to access previously generated structured data package or other data. In this case, data store 728 may include a cloud storage as described above.

Still referring to FIG. 7, operating system 712 may communicate with one or more token reading device 732 via Bluetooth Low Energy (BLE). In a non-limiting example, token reading device 732 may include a card reader, wherein the card reader is a device used to read and extract data from various types of cards, such as, without limitation, credit cards, debit cards, smart cards, magnetic strip cards, and/or the like. In a non-limiting example, token reading device 732 may be configured to process an electronic payment transaction, enabling access to plurality of service units and/or vehicle cares. Token reading device 732 may be communicate with a payment module 736, wherein the payment module 736 is a system component that handles the processing of any payment transaction within the system. In some cases, payment module 736 may be a cloud system component; for instance, and without limitation, payment module 736 may include a set of APIs configured for processing online payment. APIs may include a third-party (3rd party) payment processing APIs. In a non-limiting example, first control module 716 may be configured to manage membership-related data within plurality of user profiles (e.g., create/subscribe to a new membership, retrieving membership status, updating membership status, deleting/unsubscribe membership) via payment module 736 communicatively connected to first control module 716 by utilizing one or more STRIPE APIs. User profile may include any user profile as described in U.S. patent application Ser. No. 18/196,494. Payment module 736 and payment processing process may be consistent with any payment module 720 and processing steps as described in U.S. patent application Ser. No. 18/196,238.

Still referring to FIG. 7, additionally, or alternatively, opera ting system 712 may communicate with a second control module 740, wherein the second control module 724 may be a control module hosted within vehicle care site (i.e., on-premises control module). In a non-limiting example, second control module 740 may include secondary control unit configured to control plurality of on-site devices (i.e., on-premises system components 704) such as, without limitation, plurality of vehicle care devices, point-of-sale (POS) devices 744. In some cases, POS devices 744 may include, without limitation, cashdrawer, receipt printer, and/or the like. In some cases, secondary control unit may be configured to communicate with another secondary control unit. In a non-limiting example, second control module 740 may be configured to communicate with a remote tunnel controller (RTC) 748, wherein the RTC 748 is a device or software application that allows for remote monitoring and control of a car wash tunnel (service unit). RTC 748 may enable second control module 740 to monitor and manage the car wash tunnel from a central location, rather than needing to be physically present on-site. In some cases, RTC 748 may be used to monitor plurality of operational parameters such as, without limitation, status of plurality of service units, vehicle throughput, chemical usage, and the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
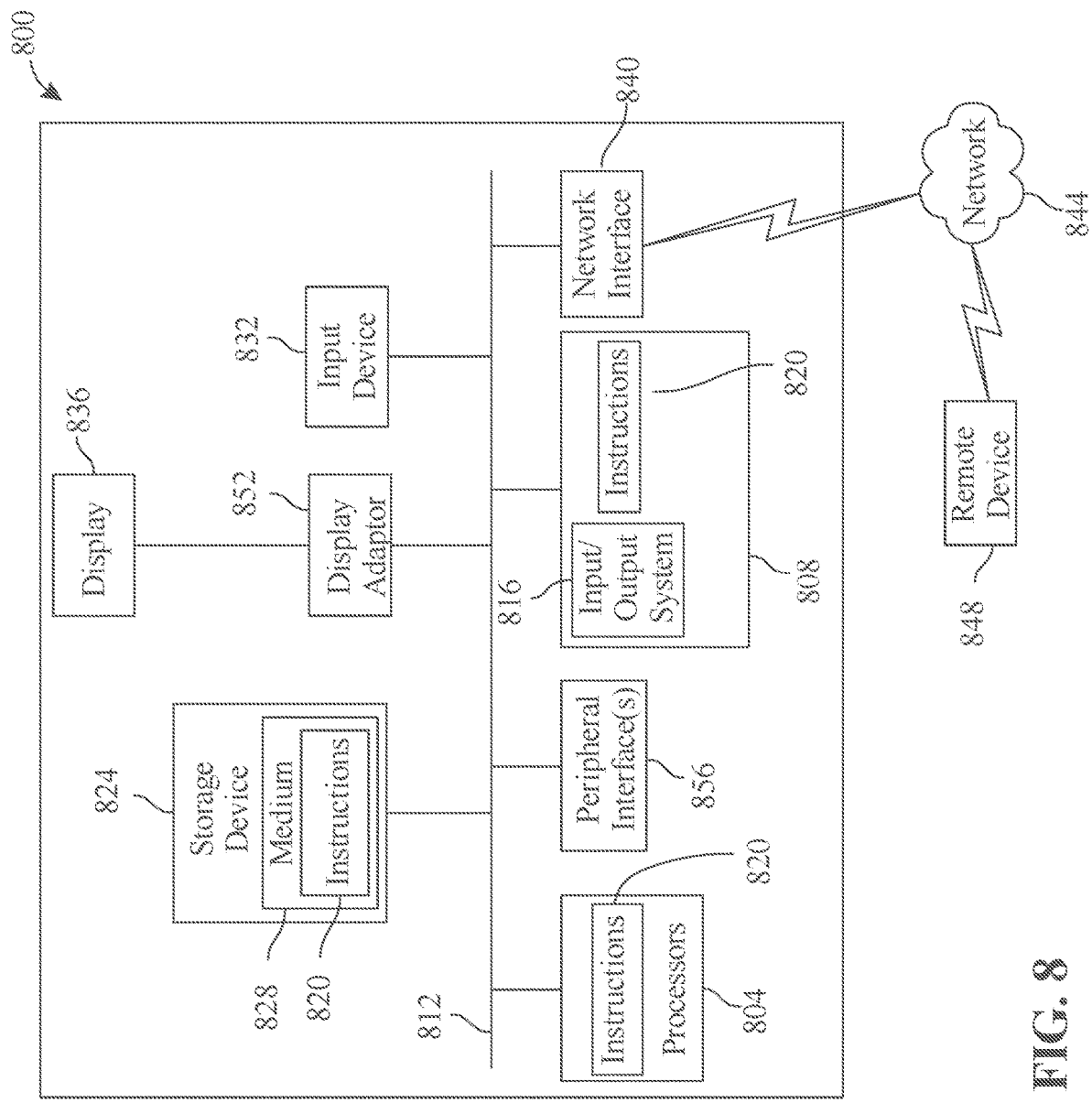
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for initiating a command for an equipment controller, the apparatus comprising:
    at least a processor; and
    a memory communicatively connected to the at least processor, wherein the memory contains instructions configuring the at least processor to:
        receive a structured data package from a primary controller, wherein the structured data package comprises a configuration category and a malfunction datum, wherein the malfunction datum comprises an indication that a malfunction is at an increased chance of occurring;
        identify an equipment command as a function of the structured data package, wherein identifying the equipment command comprises:
            classifying the configuration category into an implementation category;
            and identifying the equipment command as a function of the implementation category;
        initiate the equipment command by transmitting the equipment command to an equipment controller, wherein the equipment controller comprises car wash tunnel equipment; and
        after initiating the equipment command, transmitting an unstructured signal comprising a sensor output associated with the car wash tunnel equipment to the primary controller;
    wherein the equipment command configures the equipment controller to utilize a function of equipment associated with the equipment controller.

2. The apparatus of claim 1, wherein the processor is a component of a first secondary controller, wherein the structured data package comprises data originating from a second secondary controller.

3. The apparatus of claim 1, wherein the memory contains instructions configuring the at least processor to identify the equipment command using a rule based engine.

4. The apparatus of claim 1, wherein the memory contains instructions configuring the at least processor to identify the equipment command by:
    training an equipment command machine learning model on a training dataset including a plurality of example structured data packages as inputs correlated to a plurality of example equipment commands as outputs; and
    generating the equipment command as a function of the structured data packages using the trained equipment command machine learning model.

5. The apparatus of claim 1, wherein the memory contains instructions configuring the at least processor to identify the equipment command by receiving an equipment command user input from the user.

6. The apparatus of claim 1, wherein the memory contains instructions configuring the at least processor to transmit unstructured data indicating an operational status of the equipment to the primary controller.

7. The apparatus of claim 1, wherein the equipment comprises equipment at a vehicle care site.

8. The apparatus of claim 1, wherein classifying the configuration category into an implementation category comprises:
    training an implementation classifier on a training dataset including a plurality of example configuration categories as inputs correlated to a plurality of example implementation categories as outputs; and
    generating the implementation category as a function of the configuration category using the trained implementation classifier.

9. The apparatus of claim 1, wherein the structured data package comprises a target parameter value.

10. The apparatus of claim 1, wherein the indication that a malfunction is at an increased chance of occurring is within a car wash system.

11. A method of initiating a command for an equipment controller, the method comprising:
    using at least a processor, receiving a structured data package from a primary controller, wherein the structured data package comprises a configuration category and a malfunction datum, wherein the malfunction datum comprises an indication that a malfunction is at an increased chance of occurring;
    using at least a processor, identifying an equipment command as a function of the structured data package, wherein identifying the equipment command comprises classifying the configuration category into an implementation category, and identifying the equipment command as a function of the implementation category;
    using at least a processor, initiating the equipment command by transmitting the equipment command to an equipment controller, wherein the equipment controller comprises car wash tunnel equipment; and using at least a processor, after initiating the equipment command, transmitting an unstructured signal comprising a sensor output associated with the car wash tunnel equipment to the primary controller;

wherein the equipment command configures the equipment controller to utilize a function of equipment associated with the equipment controller.

12. The method of claim 11, wherein the at least processor is a component of a first secondary controller, wherein the structured data package comprises data originating from a second secondary controller.

13. The method of claim 11, wherein the equipment command is identified using a rule based engine.

14. The method of claim 11, wherein the equipment command is identified by:
training an equipment command machine learning model on a training dataset including a plurality of example structured data packages as inputs correlated to a plurality of example equipment commands as outputs; and
generating the equipment command as a function of the structured data packages using the trained equipment command machine learning model.

15. The method of claim 11, wherein the equipment command is identified by receiving an equipment command user input from the user.

16. The method of claim 11, further comprising transmitting to the primary controller unstructured data indicating an operational status of the equipment to the primary controller.

17. The method of claim 11, wherein the equipment comprises equipment at a vehicle care site.

18. The method of claim 11, wherein classifying the configuration category into an implementation category comprises:
training an implementation classifier on a training dataset including a plurality of example configuration categories as inputs correlated to a plurality of example implementation categories as outputs; and
generating the implementation category as a function of the configuration category using the trained implementation classifier.

19. The method of claim 11, wherein the structured data package comprises a target parameter value.

20. The method of claim 11, wherein the indication that a malfunction is at an increased chance of occurring is within a car wash system.

* * * * *